United States Patent [19]

Schlaepfer

[11] 4,071,387

[45] Jan. 31, 1978

[54] DECORATION OF SHEET MATERIALS

[75] Inventor: Robert J. Schlaepfer, Saint Gallen, near Lake Constance, Switzerland

[73] Assignee: Jacob Schlaepfer & Co. A.G., St. Gallen, Switzerland

[21] Appl. No.: 614,709

[22] Filed: Sept. 18, 1975

[30] Foreign Application Priority Data

Sept. 19, 1974 United Kingdom ............... 40872/74
Apr. 15, 1975 United Kingdom ............... 15444/75

[51] Int. Cl.[2] .......................... B44C 1/16; B32B 3/10; B32B 7/10

[52] U.S. Cl. .................................... 156/148; 156/155; 156/230; 156/234; 428/42; 428/187; 428/196; 428/200; 428/201; 428/202; 428/343; 428/347; 428/354; 428/914

[58] Field of Search ................. 428/914, 42, 347, 354, 428/343, 187, 196, 200, 201, 202, 102, 104; 156/240, 230, 234, 148, 155, 247; 112/403, 439, 266

[56] References Cited

U.S. PATENT DOCUMENTS

| | | | |
|---|---|---|---|
| 1,171,154 | 2/1916 | Stern | 112/439 |
| 1,856,556 | 5/1932 | Hemmerich | 112/266 |
| 2,741,569 | 4/1956 | Stanford | 428/255 |
| 3,463,692 | 8/1969 | Brunner | 428/104 X |
| 3,567,567 | 3/1971 | Sherrill | 428/196 X |
| 3,657,060 | 4/1972 | Haigh | 428/187 X |
| 3,816,211 | 6/1974 | Haigh | 428/187 X |
| 3,874,958 | 4/1975 | Scholtis et al. | 428/187 X |
| 3,896,249 | 7/1975 | Keeling et al. | 428/914 X |
| 3,907,974 | 9/1975 | Smith | 428/914 X |
| 3,922,435 | 11/1975 | Asnes | 428/914 X |

*Primary Examiner*—Harris A. Pitlick
*Attorney, Agent, or Firm*—Edwin E. Greigg

[57] ABSTRACT

The invention relates to decorations for application to sheet materials and comprises a decorative article, a layer of heat activated adhesive applied to a first surface of the article and a carrier sheet adhering to a second surface of the article which carrier sheet is heat stable at the temperature of activation of said adhesive whereby on positioning of the article with its adhesive surface juxtaposed the sheet material the application of heat and pressure activates the adhesive to produce bonding of the article to the sheet material per se. The invention is particularly concerned with the use of an embroidery pattern which is formed on a thermally decomposable sheet substrate by use of an embroidery pattern of thermoplastic threads on one side thereof and non-thermoplastic or high melting thermoplastic embroidery threads on the other thereof so that on the application of heat and pressure the substrate degrades and the thermoplastic threads are rendered tacky to merge with the sheet material to which the decoration is to be applied, the degradable substrate being removed with the carrier sheet after application.

6 Claims, 5 Drawing Figures

DECORATION OF SHEET MATERIALS

The present invention relates to the decoration of sheet materials and has particular reference to the application of embroidery patterns, decorative stones and the like to sheet materials.

At the present time the application of such decorative materials, particularly embroidery to sheet materials and/or fabric, is relatively expensive. Production costs are increased by the fact that in many cases there is a customer demand for fabrics which are not embroidered or decorated all over their area but only in certain places. The application of embroidery or decorative articles to specific areas is very expensive if the decorative cover factor, that is to say, the ratio between the total area of the sheet material and the decorated areas, is low due to the fact that the embroidering machines or the machines applying the decorative articles operate with low efficiency when fabrics or other sheet material have to be positioned on the machine and then taken off after a relatively small number of decorating operations. In general the positioning and removal of the sheet materials on such machines is largely done by hand and, in consequence, a large number of hand manipulations for a small number of decorative operations renders the decoration relatively costly.

When making up decorative sheet material into garments and the like, the cutting pattern has to be very carefully laid out in view of the fact that in the made-up garment, the decorated areas have to be correctly positioned. The need for matching the cut parts of the garment to be made as regards the position of the decorations will produce much more waste than in the case of undecorated fabrics. In garment making, during cutting it is usual to do the cutting simultaneously on a relatively large number of layers of material stacked one on top of the other. This technique is very difficult in the case of locally embroidered fabrics due to the varying thicknesses of the fabrics carrying the embroidered portions in the stack.

According to the present invention, therefore, there is provided a decoration for application to sheet material which decoration comprises:

a decorative article, a layer of heat-activated adhesive applied to a first surface of said article, and a carrier sheet adhering to a second surface of said article, which carrier sheet is heat stable at the temperature of activation of said adhesive, whereby on positioning the said article with its adhesive surface juxtaposed the sheet material, the application of heat and pressure activates said adhesive and produces bonding of the article to the sheet material.

The decorative article may be an embroidered pattern which may be embroidered on a sheet-like substrate of thermally decomposable material, the embroidered pattern comprising on a first side of said substrate a pattern of non-thermoplastic or high melting thermoplastic embroidery threads defining said pattern, and on the other side of said substrate a pattern of thermoplastic threads which become tacky at elevated temperatures and which constitute the heat activated adhesive. Thus, the heat activated adhesive may be a thermoplastic material which becomes tacky at elevated temperatures whereby on the application of heat and pressure the tacky thermoplastic material deforms to merge or bond with the sheet material to which the decoration or pattern is to be applied.

It will be appreciated, therefore, that where hitherto, the use of thermally degradable substrates for embroidery patterns has resulted in the need for removal of the degraded substrate after application of the embroidery pattern. Hitherto this has been done by brushing or air-blowing. Since the degradation of the substrate is usually produced by acid hydrolysers, the particles of degraded substrate removed from the fabric to which the pattern is applied may have an irritating or even toxic effect on operators who inevitably come into contact with the particles so removed. In the case of the present invention, the particles of degraded substrate are removed with the carrier sheet, thus overcoming this particular problem inherent in the prior art.

In the case of the embroidery layer, the carrier sheet may be applied to the non-thermoplastic or high melting thermoplastic threads and the application of heat and pressure results in the melting or tackiness of the thermoplastic threads to bond to the material and the simultaneous decomposition of the sheet-like substrate to which the pattern was originally embroidered.

The carrier sheet forming a backing layer for lamination with the thermally decomposable substrate of the embroidered decoration may be applied by means of a pressure-sensitive adhesive, preferably initially applied to the sheet itself.

The minimum decomposition temperature of the heat degradable substrate may be 100° C. and the minimum temperature at which the low-melting thermoplastic embroidering yarns become tacky may be 70° C. The fusing temperature at which the adhesive layer is activated is preferably at least 100° C. and at least 20° C. below the softening point of any thermoplastic material present in the temporary laminate excluding the thermoplastic threads of the substrate itself.

The melting points of any thermoplastic material in the temporary laminate or carrier sheet may be higher than 180° C. and preferably greater than 220° C.

The invention also includes a method of applying decorative articles to sheet materials, which method comprises:

forming with or applying to a surface of an article a heat activated adhesive, laminating said article with a support sheet which is stable at temperatures of activation of said adhesive, which lamination is carried out on a surface of said article remove from said adhesive layer, positioning said laminate on a sheet material to be decorated, applying heat and pressure to activate said adhesive to cause adhesion between the article and sheet material, and thereafter stripping the support sheet constituting the laminate from said decorative article.

In particular, the present invention relates to a process for embroidering sheet material which method comprises:

forming an embroidery pattern on a sheet-like substrate of a thermally decomposable material, the pattern being formed using thermoplastic threads on one side of said substrate which threads define an embroidery pattern and which become tacky at elevated temperature, and a co-operating pattern of non-thermoplastic or high melting thermoplastic embroidery threads defining said pattern on the other side of said substrate, laminating a carrier sheet with said substrate on the side thereof of the non-thermoplastic or high-melting thermoplastic threads by means of an adhesive, which support layer is a non-thermoplastic or high-melting thermoplastic material, positioning the laminate so formed on a fabric to be embroidered with the thermoplastic threads juxtaposed said fabric, applying heat and pressure to said carrier layer to produce decomposition of the substrate and soften the thermoplastic thread to cause adhesion thereof to said fabric, and thereafter stripping the carrier sheet from the pattern by the non-thermoplastic or high thermoplastic embroidery threads or secured to the fabric by means of fusion or adhesion of the thermoplastic thread to the fabric itself.

As stated above, the heat-activated adhesive is preferably a thermoplastic layer which softens on the application of heat. The heat-activated adhesive may be a low-melting thermoplastic yarn which becomes tacky at a temperature of approximately 70° or more. Typical heat-activated adhesives are nylon 11, and polyethylene. The carrier sheet may be non-soven fabric formed of regenerated cellulose fibres bonded together by non-thermoplastic binders, such as a cotton backed plastic film having a melting point greater than 200° C.

The decorative article itself may be an embroidery pattern, which have a layer of heat-activated adhesive. The carrier sheet may be bonded to the articles per se by means of a pressure-sensitive adhesive which may comprise an aqueous paste of 800 parts of butyl arrylate and 600 parts of carboxy-methyl-cellulose.

For the purposes of the present specification, the term "heat activated adhesive" is intended to include materials which soften and fuse with the application of heat in order to provide a bond between the decorative article and a fabric or sheet layer to which it is applied.

In another embodiment of the present invention, there is provided a process which comprises:

a. embroidering a thermally decomposable sheet substrate using on one side of the substrate a thermoplastic embroidering thread which becomes tacky at an elevated temperature, and on the other side a non-thermoplastic or high-melting thermoplastic embroidery thread which serves to define the pattern to be embroidered,
b. forming a temporary laminate with said embroidered substrate on the side provided with the non-thermoplastic or high-melting embroidering thread by applying a high-melting or non-thermoplastic sheet material thereto and securing the same with an adhesive,
c. positioning the laminate so formed on the sheet material to be decorated with the thermoplastic threads of the embroidered pattern juxtaposed the sheet to be decorated,
d. applying heat and pressure so that the substrate is thermally decomposed and the low melting embroidery threads are rendered tacky to bond the non-thermoplastic or high-melting thermoplastic embroidery pattern to the sheet,
e. and thereafter detaching the high-melting or non-thermoplastic sheet carrier wherein the minimum decomposition temperature of the substrate is 100° C. and the minimum temperature at which the low-melting yarns become tacky is 70° C. and wherein the fusion temperature is not less than 100° C. and at least 20° C. below the softening point of the high-melting or non-thermoplastic sheet material.

The laminate may be cut into smaller pieces for positioning on the sheet material prior to heat treatment if desired.

Following is a description by way of example only of methods of carrying the invention into effect.

EXAMPLE I

A rayon print cloth was treated with a potentially acidic carbonising agent which decomposes the cellulose if heated to 150° C. or more. The cloth so treated was then embroidered on a Saurer embroidering machine with a flower pattern. The embroidering threads used were an acrylic yarn, and the bobbin thread consisted of nylon 11 yarn, that is to say, the bobbin thread corresponded to the thermoplastic yarn constituting the adhesive for subsequently securing the embroidering thread to a material to be decorated.

After embroidering, the patterns were cut out in such a way that rectangular pieces of fabric were formed, the embroidery pattern being in the centre of each rectangle.

A carrier fabric was then prepared comprising a non-woven fabric made from regenerated cellulosic fibres bonded together by a non-thermoplastic binder and then subjected to a caustic treatment. This non-woven carrier fabric was then coated with a pressure-sensitive adhesive.

The adhesive was formed of an aqueous paste containing 800 parts of butyl acrylate and 600 parts of carboxymethyl-cellulose as a thickening agent. The pressure-sensitive adhesive was applied to a surface of the carrier fabric at a rate of 60 grams per square metre and was sufficient to provide bond strength between the cellulosic fibres and the embroidery pattern.

The rectangular pieces of heat-degradable fabric each carrying an embroidery pattern were then placed in a press with the acrylic fibres uppermost. A piece of the carrier sheet material was then applied to the upper surface of the pattern with the pressure-sensitive adhesive juxtaposed the acrylic fibres and was bonded thereto by the application of light pressure at room temperature.

The resulting laminate had a bond strength between the regenerated cellulosic fibres and the embroidery pattern sufficient to withstand subsequent handling but not sufficient to make peeling off the final step of the process difficult.

The embroidery pattern was then applied to a piece of velvet by laying the laminate in contact with the surface of the velvet with the nylon 11 bobbin thread contiguous the fabric surface. The fabric to be decorated and the pattern laminate were then placed between the jaws of a flat bed press with the heated jaw facing the non-woven carrier fabric. Pressure was then applied for a period of 20 seconds and the heat transmitted from the heated plate at a temperature of 180° C. through the non-woven carrier fabric and the embroidery was sufficient to a. fuse the embroidery patterns to the fabric to be decorated with the nylon 11 bobbin threads serving as an adhesive, and
b. sufficient to degrade the heat-degradable supporting fabric to such an extent that all tensile strength threin was virtually destroyed.

After the heat-treatment, the fabric and pattern laminate were then removed from the flat bed press and after cooling, the non-woven fabric was peeled from the fabric to be decorated. The powder like remainder of the heat degradable fabric generally adhered to it and was thus removed from the fabric to be decorated, while the embroidery pattern remained firmly bonded to the velvet. Small particles of the heat-degradable substrate remaining in the interstices of the embroidery patterns were readily removed by softly brushing.

EXAMPLE II

A heat degradable cotton fabric containing aluminium chloride as a potentially acidic agent which was capable of decomposing cellulose when heated to a temperature of 150° C. or higher, was embroidered in a narrowly spaced pattern, the bobbin thread being nylon 11, as the heat sensitive adhesive, and the embroidering thread being dyed cotton, constituting and defining the pattern.

The heat-degradable fabric thus embroidered was die-cut into rectangular pieces, each having the embroidery pattern located in the centre thereof. These rectangular pieces were then laminated in the manner described in the previous Example to a carrier fabric, which in this case was cotton print cloth coated with the pressure-sensitive adhesive described in Example I.

This carrier fabric had the same width as the fabric to be decorated and the spacing pattern for the rectangular pieces was printed on it to facilitate the superimposition of the cut rectangular pieces. The rectangular pieces of heat-degradable fabric containing the pattern were then bonded to the carrier fabric in the manner described in the previous Example.

The fabric to be decorated (cotton knit) and the pattern laminate were then passed together through a calender press so that the nylon II bobbin threaded were juxtaposed the fabric to be decorated. The temperature of the press was 90° C. and the exposure to this temperature was a period of 20 seconds and the pressure applied being 50 to 100 grams per square centimetre.

After the fusion process was completed and the materials had cooled, the carrier fabric was peeled from the fabric to be decorated and the residual components of the heat-degradable cotton fabric were brushed from the surface of the pattern. It was observed that the embroidered pattern was firmly fused and bonded to the surface of the fabric to be decorated by the nylon 11 bobbin threads.

EXAMPLE III

Example I was repeated in which the following alterations were made:

The heat-degradable fabric was a viscose filament fabric treated with aluminium chloride to permit complete degradation of the cellulose at temperatures of 150° C.

The embroidery thread was a metallised yarn, namely polyester film metallised with aluminium vapour, laminated to another polyester film, cut into very narrow ribbons and then processed into a twisted yarn containing a supporting polyester filament. The thermoplastic bobbin thread in this case was polyethylene yarn.

The carrier sheet material was a polyester film having a melting point greater then 200° C. and coated with the pressure sensitive adhesive used in Example I.

The fabric to be decorated was triacetate sateen, and the fusing conditions were hand ironing at a temperature of 150° C. for a period of 20 seconds.

EXAMPLE IV

Example III was repeated but the rectangular shapes of the embroidered heat-degradable material with embroidery pattern in its centre were fused in a flat-bed press to handkerchieves, the handkerchieves facing the hot jaws of the press.

EXAMPLE V

Example II was repeated and a cotton terry towel cloth was used as the fabric to be decorated and the decoration was carried out in a substantially continuous process.

EXAMPLE VI

Small decorative glass particles were coated on one surface with a polyethylene coating to serve as a fusible adhesive. The particles, which had the shape of cut diamonds and consisted of glass, were positioned for assembling mechanically on stencils in a pattern, the base of the diamond shape being supported by the stencil and the facet-like topside facing upwards.

A carrier sheet material consisting of the non-woven fabric coated with a pressure-sensitive adhesive and prepared in the manner described in Example I was then pressed against the stencils in a continuous calendar press equipped with a hard roll and a very soft roll (neoprene rubber) shore Hardness 10. The facet-like topside of the decorating particle becomes embedded in and secured to the carrier material, the base of the decorating particles became disengaged from the stencil, and the carrier material after leaving the calendar press was parted from the stencils.

The carrier fabric carrying the decorating particles was then laid onto a wool dress fabric, both fabrics were passed through a semicontinuous flat-bed press, the temperature of the heated plate being 160° C, and the pressing time 20 seconds, the pressure 50 to 100 grams per square centimetre.

Under the influence of heat and pressure, the polyethylene coating at the base of the diamond-shaped decorating particles acted as fusible adhesive between the wool fabric and the particles were bonded firmly thereto.

After cooling, the carrier sheet material was then peeled from the decorative particle, leaving the particles firmly secured to the wool fabric. The bond strength between the carrier sheet materials and the decorative particles was substantially lower than the strength of the bond between the wool fabric and the decorative particles produced by the fusion step.

EXAMPLES VII to XX

Additional tests were carried out as set out in the following tables.

| | Examples | | |
|---|---|---|---|
| | VII | VIII | IX |
| 1) Base Fabric | glass particles | as Examples III and VII, | as Example VI |

-continued

| | Examples | | |
|---|---|---|---|
| (thermo-degradable) | | applied to wool velvet | |
| 2) Designing Method (pattern) | positioning of glass particles on carrier sheet in pattern | as Example VII | as Example VI |
| 3) Thermoplastic Thread (fusible adhesive) | polyethylene on base of glass particles | as Example VII | as Example VI |
| 4) Embroidery Thread | — | as Example VII | as Example VI |
| 5) Carrier Sheet Material | cotton interlining fabric, napped on one side | film laminate polyester/polyethylene | polyester film coated with acrylic adhesive |
| 6) Adhesive used | as Example I | polyethylene face of film | 72% acrylic copolymer 14% paraffine emulsion 13, 5% Collacral VL300 90 g/m2 applied (wet) |
| 7) Joining of Embroided Base Fabric to carrier Sheet Material | roller press, upper roller, 10 shore hardness (neoprene sponge rubber), lower roller very hard | roller press, linear pressure 150 kg/cm | roller press as Example VII |
| 8) Material to be Decorated | wool gabadine | | cotton corduroy |
| 9) Transfer of Decorative Elements | semi continuous, 160° C 20 seconds, 100g/sq.cm | | that bed press 160° C, 20 seconds, 50g/cm2 |
| 10) Removal of Heat-Degraded Base Fabric | peeling off of carrier fabric after cooling | peeling off of carrier fabric after cooling | peeling off of film after cooling |

| X | XI | XII | XIII |
|---|---|---|---|
| 1) as Example VI | as Example VI | rayon cretonne, treated as Example I | as Example XII |
| 2) as Example VI | as Example VI | embroidery | as Example XII |
| 3) as Example VI | as Example VI | nylon 11 | as Example XII |
| 4) as Example VI | as Example VI | dyed cotton | as Example XII |
| 5) as Example IX | thin cardboard | cardboard laminated to butyl acrylate adhesive film | as Example XII |
| 6) as Example IX | as Example IX | butyl acrylate | as Example XII |
| 7) as Example IX | calender, cold | roller press, cold (as Example VI) | |
| 8) belt buckle brass | viscose filament fabric, embroidered with triacelate pailletes | rayon knit, 5 gage | wool upholstery fabric |
| 9) hand iron 20 seconds/160° C | semi-continuous flat bed press, 160° C, 20 seconds | semi-continuous flat bed press, 190° C, 25 seconds, 100 g/cm2 | hand iron, 150° 30 seconds, 50 g/cm2 |
| 10) peeling off of carrier film | peeling off of cardboard after cooling | peeling off of cardboard, removal of base fabric residnes with air jet | as Example XII |

| XIV | XV | XVI | XVII |
|---|---|---|---|
| 1) as Example XII | fusible net (Delnet from Hercules Inc., Wilmington, Del.) | as Example XV, net consisting of polyethylene | polyamide net, 50g/m2 (Xiro, Freiburg, Switzerland) |
| 2) as Example XII | embroidery | embroidery | embroidery |
| 3) as Example XII | terpolymer of nylon 6.66 and 11 | non-thermoplastic yarn (dyed cotton) | as Example XV |
| 4) | cotton, dyed | dyed cotton | dyed polyester yarn |
| 5) as Example XII | "Sprint" film (3M Corp. Minnesota) | cotton print cloth | as Example IX |
| 6) as Example XII | | as Example I | as Example IX |
| 7) as Example XII | as Example IX | as Example IX | as Example IX |
| 8) viscose filament embroidered (all-over) with PVC pailletes | terry cloth, dyed | terry cloth, dyed | wool muslin |
| 9) as Example XII | as Example XII | as Example XII | as Example XIII |
| 10) as Example XII | as Example IX | as Example IX | as Example IX |

| XVIII | XIX | XX |
|---|---|---|
| 1) polyamide net (terpolymer of nylon 6.66 and 11, Xiro) | polyester net (polyester T 1, melting point 129° C, Dynamit Nobel, Troisdorf) | polypropylene fabric (print cloth construction) polypropylene containing cobalt salts making fiber thermo-degradable |
| 2) embroidery | embroidery | tufting |
| 3) acrylic, dyed | cotton/polyester (50/50) | polyester (melting point 130° C, type T 1 of Dynamit Nobel, Troisdorf, Germany West) |
| 4) acrylic, dyed | cotton/polyester (50/50) | rayon |
| 5) as Example XV | cotton cheesecloth, coated with adhesive | paper laminated to low-melting polyamide net |
| 6) as Example I | as Example VII | polyamide net, softing point 70-80°, Xiro, Freiburg, Switzerland |
| 7) as Example IX | as Example VII | calender, temperature 180° C |
| 8) quilted bedspread | tufted carpet | durable press, treated cotton popelin |
| 9) as Example XII | as Example X | heated drum (temperature 180° C), sheet material pressed against drum by felt blanket, time of contact 1 minute |
| 10) as Example IX | as Example X | as Example XII |

EXAMPLE XXI

1. A thermodegradable rayon fabric (same as in Example I) was embroidered with acrylic yarns, using a bobbin thread of a terpolymer consisting of nylon 6, nylon 66 and nylon 11. The embroidered motifs then were cut out.

2. Facetted glass particles with polyethylene as heat-sealable adhesive on their bases were positioned by means of stencils in a pattern and fixed on the adhesive side of a transparent carrier sheet the polyethylene-covered base facing away from the carrier sheet consisting of a laminate of a polyester and cellophane film coated with a pressure-sensitive adhesive on the cellophane side. Glass particles of different size, colour and shape thus were arranged like mosaics to form a pattern adhering to the carrier material.

3. The pre-cut embroidered motifs of step 1 then were present on to the carrier sheet holding the glass particles with its particle-covered adhesive side facing the motifs (embroidered fabric described under (1)), on a roller press as in Example VII in such a way that the thermoplastic bobbin threads were facing away from the carrier sheet, i.e., remained available for subsequent fusing operations and were not affected by the lamination step.

Since the pre-cut motifs did not cover all areas of the adhesive side of the transparent carrier; the motif-covered side of the laminate was covered with a protective sheet (e.g. polyethylene film) for storage and shipping purposes, i.e., until the motifs were fused to the sheet material to be decorated. This sandwich then was die-cut into pieces comprising clusters of motifs. Instead of cutting this sandwich structure at this stage into the desired pattern size, one can carry out steps (2) and (3) with sheet material having already the appropriate size.

4. After peeling off the protective film, the laminate was laid on the cotton muslin which had to be decorated, the thermoplastic nylon bobbin threads and the polyethylene coated bases of the glass particles facing the muslin. Fusing of the embroidery motifs and the glass particles to the muslin was effected by pressing on a semi-continuous press for 25 seconds (100 g/sq.cm. pressure); the heat (180° C.) being applied through the cotton muslin. This heat treatment not only fused the embroidery motifs and the glass particles to the cotton muslin, but at the same time destroyed the heat-degradable rayon fabric. The layers were then removed from the press and cooled. The carrier sheet is peeled off, removing at the same time the carbonised rayon fabric by the adhesive.

EXAMPLE XXII

1. A printed cotton poplin and a thick dyed acrylic cretonne, both coated with 30 grams/square meter of polyethylene powder (particle size 50 to 200 microns) on one side, were cut into flower-shaped pieces.

2. A thermo-degradable rayon fabric was embroidered with acrylic threads in a line-pattern resembling a quilting seam, the outline, shape and dimension of this pattern matching that of the flower-shaped pieces, i.e., the embroidery pattern having the same contours as the flower shape. A polyamide terpolymer thread was used as bobbin thread (fusing point 110° to 120° C).

The patterns then were cut out, leaving about 1 cm in and outside the embroidered line pattern. The cut part thus produced had the shape of a ring following the contours of a flower.

3. A transparent carrier sheet consisting as described in Example XVIII of a polyester/cellophane extrusion film coated with a pressure-sensitive adhesive on the cellophane side was laid on a table, the adhesive side facing up. The pre-cut flower-shaped pieces of the printed cotton fabric and the dyed acrylic fabric from step 1 were alternately placed on the carrier sheet in a predetermined pattern (polyethylene coated side up) sufficient pressure being applied to effect adhesion. Then the ring-like pre-cut shapes of the heat-degradable embroidered rayon fabrics were placed on or around the edges of matching flower-shaped pieces of the cotton and acrylic fabrics with gentle pressure. For storage and shipping purposes a protective film (polyethylene) was placed on top of the carrier sheet holding the pre-cut pieces before batching this sandwich structure.

4. Fusing of the motifs to a silk shantung fabric after removing the protective film was effected as described in Example XVIII, the heat being transmitted through the silk fabric, the silk fabric being laid on top of the carrier sheet holding the motifs.

After cooling the carrier sheet was peeled off, the adhesive pressed on it taking off the carbonised remains of the heat-degradable rayon fabric. During the heat treatment the terpolymer polyamide bobbin thread had acted as fusible adhesive to bond the ring-like embroidered parts to the silk, while adherence of the printed cotton fabric pieces and the acrylic fabric pieces to the silk had been achieved by means of the polyethylene powder present on their under side.

The accompanying drawings illustrate the sequence of events with reference to Example XXI above. In the drawings.

In the initial step the glass particles **4*a* are applied to a backing stencil 1*a* and each glass particle carried a small portion of a thermoplastic coating on the base thereof. A carrier sheet 2 is provided with an adhesive layer on the face thereof and is applied to the face containing the glass particles 4*b***.

The particles then adhered in a predetermined pattern and are removed from backing stencil **1*a* to leave the carrier sheet 2 supporting and carrying the glass particles 4** in their pattern disposition.

Figure 1:
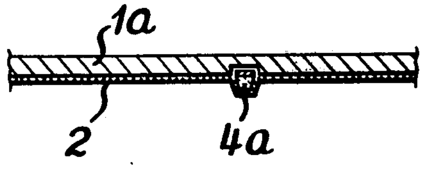
FIGS. 1 and 2 are sections through stencils for positioning the glass particles and incorporating a carrier sheet.
Figure 2:
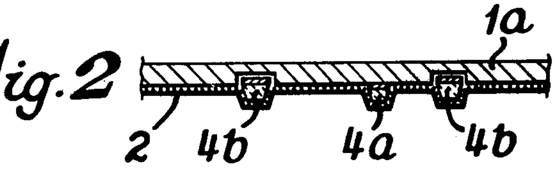
Figure 3:
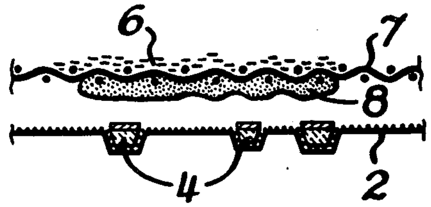
FIG. 3 illustrates the application of the carrier sheet to the degradable layer carrying the embroidery motifs.
Figure 4:
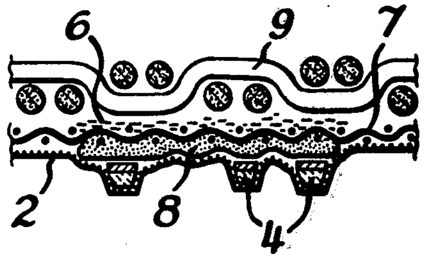
FIG. 4 illustrates the application of the entire pattern or design to a fabric to be decorated and FIG. 5 illustrates the decoration applied to the fabric to be decorated.
Figure 5:
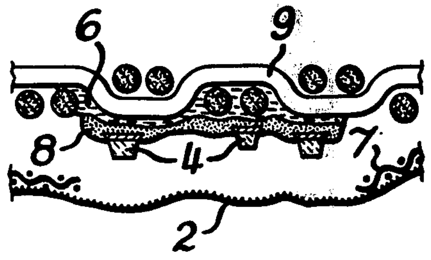

The same time a decorative embroidered pattern 8 is applied to a thermo-degradable rayon fabric 7 having a backing of thermoplastic polyethylene threads which are heat fusible. The embroidery pattern 8 is positioned with respect to the material 9 to be decorated with the thermoplastic threads 6 juxtaposed material 9. The covering layer supporting and carrying the glass particles 4 are then positioned over the embroidery pattern and heat and pressure is then applied. The application of heat results in thermal degradation of the fabric 7 and the deformation of the thermoplastic threads 6 to secure the embroidery pattern to the fabric 9 and at the same time to cause the thermoplastic coating on the base of each glass particle to be fused into and distributed within the embroidery pattern 8 to retain the glass particles in their decorative disposition. Removal of the backing sheet 2 results in removal of the exposed and degraded fabric 7 as shown in FIG. 5.

The foregoing Examples illustrate some of the embodiments in accordance with the present invention. It will be apparent to the man skilled in the art that many variations of the invention are possible.

The major advantages which accrue from the present invention are that the embroidery can be carried out on the substrate under the optimum conditions, that is to say, with the minimum spacing between the pieces of embroidery patterns irrespective of the spacing of the patterns in the final product, for instance, on a garment. Embroidering machinery efficiency is therefore much greater than if the fabrics final spacing of the design had to be the same during embroidery. Indeed, it now becomes possible to produce intricate embroidered patterns on a continuous basis without the need to position the substrate material in the embroidering machine, and the positioning only becomes necessary at the application stage.

The embroidering designs may be applied by the process designed not only to sheet materials but also to made up garments. This permits make-up to be much more efficient and foolproof. If the embroidered fabrics have to be made up, it is very difficult and time-consuming to lay out and cut the embroidered fabrics in such a way that all the embroidered designs are in the places where they are required in the made-up garment. In consequence, sewing is much more difficult and considerable waste will result in cutting.

If, on the other hand, large areas are to be provided with embroidery by fusion of the embroidery designs to the fabric these can be provided with embroideries at a predetermined spacing pattern without cutting up a temporary laminate.

The invention further enables embroidery designs to be applied to garments made up such as dresses, coats, curtains and the like.

The temporary laminate may with or without precutting be stacked, stored, shipped or retailed without difficulty and without fear of shifting or distortion of the embroidery designs. The designs of the embroidery patterns are stable and stability is enhanced by the presence of the carrier sheet.

Fusing may be carried out either in a press such as those commonly used by garment manufacturers, or by the use of a household iron.

The sheet material may be bonded to the heat-degradable embroidery substrate by means of an adhesive and this greatly facilitates the removal of the heat-degradable substrate after the heating step, which heat-degradable substrate at this stage has very little cohesion and is present in the form of a powdered substance which will largely remain on the sheet material to which it has been bonded by means of the adhesive.

Thus, the resulting powdered substance can be readily removed from the embroidery and from the fabric to be provided with embroideries.

Furthermore, instead of having to embroider and maintain a stock of many different types of embroidered fabrics with different spacings of embroideries, it is only necessary for the laminate of embroideries and decorative particles to be stocked.

I claim:

1. An embroidered article for application to a sheet material, comprising:

an embroidery pattern embroidered on a sheet-like substrate of thermally decomposable material, said substrate comprising on a first surface thereof a design of non-thermoplastic or high-melting thermoplastic embroidery threads defining said design, and on a second substrate surface a cooperating pattern of thermoplastic threads of a heat activatable adhesive material which becomes tacky at a predetermined temperature;

a heat stable carrier sheet adhesively and releasably adhered to said first surface;

said article being adapted to be positioned with its second surface juxtaposed the sheet material, and upon application of heat and pressure to said carrier sheet activate said adhesive to produce bonding of the embroidery pattern to the sheet material and facilitate removal of degraded particulate matter produced by heating said substrate upon stripping of said carrier sheet.

2. An embroidered article as claimed in claim 1, in which the said adhesive is a thermoplastic layer, which softens on the application of heat.

3. An embroidered article as claimed in claim 1, in which the heat stable carrier sheet comprises a non-woven fabric formed of regenerated cellulose fibers bonded together by non-thermoplastic binders having a melting point greater than 200° C.

4. A method of applying embroidered designs to sheet material comprising the steps of:

forming the embroidery pattern on opposite sides of a thermally decomposable substrate from substantially oppositely disposed areas of thermoplastic and non-thermoplastic embroidery threads on the said opposite sides respectively, laminating a carrier sheet to said non-thermoplastic threads, positioning the laminate into contact with a fabric with the thermoplastic threads juxtaposed to said fabric, applying heat and pressure to said carrier sheet to produce decomposition of said substrate to cause said thermoplastic threads to adhere to said fabric, and stripping the carrier sheet from the laminate to remove the degraded particulate matter produced by heating the laminate and destroying the thermoplastic threads of the embroidery design.

5. A method of applying embroidered designs as claimed in claim 4, including the further step of applying a heat actionable adhesive to one surface of said carrier sheet which surface is thereafter applied to said laminate.

6. A method of applying embroidered designs as claimed in claim 4, including the further step of applying a pressure sensitive heat activatable adhesive to one surface of said carrier sheet which surface is thereafter applied to said laminate.

* * * * *